(12) United States Patent
Takahashi et al.

(10) Patent No.: US 11,590,658 B2
(45) Date of Patent: Feb. 28, 2023

(54) TACTILE INFORMATION ESTIMATION APPARATUS, TACTILE INFORMATION ESTIMATION METHOD, AND PROGRAM

(71) Applicant: Preferred Networks, Inc., Tokyo-to (JP)

(72) Inventors: Kuniyuki Takahashi, Tokyo-to (JP); Jethro Eliezer Tanuwijaya Tan, Tokyo-to (JP)

(73) Assignee: PREFERRED NETWORKS, INC., Tokyo (JP)

( * ) Notice: Subject to any disclaimer, the term of this patent is extended or adjusted under 35 U.S.C. 154(b) by 373 days.

(21) Appl. No.: 16/706,478

(22) Filed: Dec. 6, 2019

(65) Prior Publication Data
US 2020/0130193 A1 Apr. 30, 2020

Related U.S. Application Data

(63) Continuation of application No. PCT/JP2019/000971, filed on Jan. 15, 2019.

(30) Foreign Application Priority Data

Jan. 16, 2018 (JP) .............................. JP2018-005151

(51) Int. Cl.
*B25J 9/16* (2006.01)
*G06T 7/73* (2017.01)

(52) U.S. Cl.
CPC ............. *B25J 9/1697* (2013.01); *B25J 9/163* (2013.01); *G06T 7/73* (2017.01); *G06T 2207/20081* (2013.01); *G06T 2207/20084* (2013.01)

(58) Field of Classification Search
CPC ........ B25J 9/1697; B25J 9/163; B25J 13/084; B25J 9/1612; B25J 19/021; B25J 19/023;
(Continued)

(56) References Cited

U.S. PATENT DOCUMENTS 9,579,801 B2 2/2017 Wettels
9,914,212 B2 3/2018 Wettels
(Continued)

FOREIGN PATENT DOCUMENTS

| CN | 103753585 A | 4/2014 |
| JP | H05-288543 A | 11/1993 |

(Continued)

OTHER PUBLICATIONS

Akihiko Yamaguchi et al., "Combining Finger Vision and Optical Tactile Sensing: Reducing and Handling Errors While Cutting Vegetables", IEEE-RAS International Conference on Humanoid Robots (Humanoids), 2016, pp. 1045-1051.
(Continued)

*Primary Examiner* — Abby Y Lin
*Assistant Examiner* — Esvinder Singh
(74) *Attorney, Agent, or Firm* — Foley & Lardner LLP

(57) ABSTRACT

According to some embodiments, a tactile information estimation apparatus may include one or more memories and one or more processors. The one or more processors are configured to input at least first visual information of an object acquired by a visual sensor to a model. The model is generated based on visual information and tactile information linked to the visual information. The one or more processors are configured to extract, based on the model, a feature amount relating to tactile information of the object.

34 Claims, 8 Drawing Sheets

(58) Field of Classification Search
CPC ...... B25J 13/081; B25J 13/082; B25J 13/083; B25J 9/1694; G06T 7/73; G06T 2207/20081; G06T 2207/20084; G06T 7/41; G06T 7/60; G05B 2219/39271; G05B 2219/39523; G05B 2219/40575; G05B 2219/40627; G05B 13/0265; G05B 13/027; G06N 7/005; G06N 3/006; G06N 3/0454; G06N 3/08; G06N 3/067; G06F 3/016

See application file for complete search history.

(56) References Cited

U.S. PATENT DOCUMENTS

| | | | |
|---|---|---|---|
| 10,403,037 B1* | 9/2019 | Boardman | G06T 7/60 |
| 2013/0325181 A1* | 12/2013 | Moore | B25J 13/086 901/31 |
| 2014/0365009 A1 | 12/2014 | Wettels | |
| 2016/0167228 A1* | 6/2016 | Wellman | B25J 9/1602 901/3 |
| 2017/0109874 A1* | 4/2017 | Hallasch | G06V 10/60 |
| 2017/0165832 A1 | 6/2017 | Wettels | |
| 2018/0107896 A1* | 4/2018 | Sagong | G06V 10/44 |
| 2019/0130560 A1* | 5/2019 | Horowitz | G06K 9/6254 |
| 2021/0023719 A1* | 1/2021 | Alt | G06K 9/6255 |

FOREIGN PATENT DOCUMENTS

| | | |
|---|---|---|
| JP | 2003-024306 A | 1/2003 |
| JP | 2007-245326 A | 9/2007 |
| JP | 2008-055584 A | 3/2008 |
| JP | 2009-268640 A | 11/2009 |
| JP | 2009-297064 A | 12/2009 |
| JP | 2016-528483 A | 9/2016 |

OTHER PUBLICATIONS

Alexis Conneau et al., "Very Deep Convolutional Networks for Natural Language Processing", arXiv: 1606.01781, 2016.
Diederik P. Kingma et al., "Adam: a Method for Stochastic Optimization", arXiv:1412.6980v9, 2017.
Gabriel Schwartz, "Visual Material Recognition", Drexel University, 2017.
Haolin Yang et al., "Tactile Sequence Based Object Categorization: A Bag of Features Modeled by Linear Dynamic System with Symmetric Transition Matrix", in International Joint Conference on Neural Networks (IJCNN), 2016, pp. 5218-5225.
Hideyoshi Yanagisawa et al., "Effects of Visual Expectation on Perceived Tactile Perception: An Evaluation Method of Surface Texture with Expectation Effect", International Journal of Design, vol. 9, No. 1, 2015.
Hiroyasu Iwata et al., "Design of Human Symbiotic Robot Twenty-One", IEEE International Conference on Robotics and Automation, 2009, pp. 580-586.
Hosoda, "Robot Finger Design for Developmental Tactile Interaction Anthropomorphic Robotic Soft Fingertip with Randomly Distributed Receptors". (2004) http://www.er.ams.eng_osaka-u.ac.jp/Paper/2004/Hosoda04c.pdf.
J. A. Fishel et al., "Sensing Tactile Microvibrations with the BioTac—Comparison with Human Sensitivity", IEEE RAS/EMBS International Conference on Biomedical Robotics and Biomechatronics, 2012, pp. 1122-1127.
Kaiming He et al., "Deep Residual Learning for Image Recognition", IEEE 2016, pp. 770-778.
M. K. Jonson et al., "Retrographic sensing for the measurement of surface texture and shape", IEEE Computer Society Conference on Computer Vision and Pattern Recognition (CVPR), 2009.
Midori Tanaka et al., "Investigating perceptual qualities of static surface appearance using real materials and displayed images", Vision Research, vol. 115 (2015) 246-258.
Mikawa et al., "Softness Estimations based on Images of Pushing Action Using Deep Learning", with a machine translation, TVRSJ Nol. 23 No. 4 pp. 239-248, 2018 https://www.jtage.jst.go.jp/article/tvrsj/23/4/23239/pdf/-char/ja.
Nishihara et al., "Online Algorithm for Robots to Learn Object Concepts and Language Model" IEEE Transactions on Cognitive and Developmental Systems 9.3, 2017.
Noda et al., "Multimodal Integration Learning of Robot Behavior using Deep Neural Networks", Robotics and Autonomous Systems, vol. 62, No. 6, Jun. 2014, pp. 721-736. http://www.sciencedirect.com/science/article/pii/S0921889014000396.
P. Mittendorfer et al., "Humanoid Multimodal Tactile-Sensing Modules", IEEE Transactions on Robotics, vol. 27, No. 3, 2011, pp. 401-410.
Ravinder S. Dahiya et al., "Directions Towards Effective Utilization of Tactile Skin: A Review", IEEE Sensors Journal, vol. 13, No. 11, 2013.
Roberto Calandra et al., "More Than a Feeling: Learning to Grasp and Regrasp Using Vision and Touch", IEEE Robotics and Automation Letters, vol. 3, No. 4, 2018.
Roland W. Fleming, "Visual perception of materials and their properties", Vision Research vol. 94, pp. 62-75, 2014.
Sakamoto, "Quantification of Sensibility by Onomatopoeia: Technology for Connecting Things to Sensibility "IEICE vol. I 00 No. 11 (Nov. 2017) http://app.journal.ieice.org/trial/100_11/k100_11_1193/index.html Retrieval date: Jan. 20, 2020. With a machine translation.
Schmitz et al. "Tactile object recognition using deep learning and dropout", Humanoid Robots (Humanoids), 2014 14th IEEE-RAS International Conference on. IEEE, 2014.
Sean Bell et al., "Material Recognition in the Wild with the Materials in Context Database", IEEE, 2015.
Shiv S. Baishya et al., "Robust Material Classification with a Tactile Skin Using Deep Learning", IEEE/RSJ International Conference on Intelligent Robots and Systems (IROS), 2016, pp. 8-15.
Shuiwang Ji et al., "3D Convolutional Neural Networks for Human Action Recognition", IEEE Transactions on Pattern Analysis and Machine Intelligence, vol. 35, No. 1, pp. 221-231, 2013.
Siyuan Dong et al., "Improved GelSight Tactile Sensor for Measuring Geometry and Slip", arXiv:1708.00922, 2017.
T. P. Tomo, et al., "A Modular, Distributed, Soft 3-Axis Sensor System for Robot Hands", in IEEE—RAS 16th international Conference on Humanoid Robots (Humanoids) 2016.
T. P. Torno, et al., "Covering a Robot Fingertip with uSkin: a Soft Electronic Skin with Distributed 3-axis Force Sensitive Elements for Robot Hands", IEEE Robotics and Automation Letters, 2017.
T. Paulino et al., "Low-cost 3-axis soft tactile sensors for the human-friendly robot Vizzy", ICRA 2017.
Tada et al., "Acquiring the Grasp Behavior by Anthropomorphic Soft Fingertips with Vision and Tactile Sensors" (2005) with a machine translation http://www.er.ams.eng.osaka-u.ac.jp/Paper/2006/Tada05a.pdf.
Wenzhen Yuan et al., "Connecting Look and Feel: Associating the visual and tactile properties of physical materials", IEEE 2017.
Wenzhen Yuan et al., "GelSight: High-Resolution Robot Tactile Sensors for Estimating Geometry and Force", Sensors, vol. 17, 2017.
Wenzhen Yuan et al., "Shape-independent Hardness Estimation Using Deep Learning and a GelSight Tactile Sensor", IEEE International Conference on Robotics and Automation (ICRA), 2017, pp. 951-958.
Wouter M. Bergmann Tiest, "Tactual perception of material properties", Vision Research vol. 50 (2010) 2775-2782.
Yang Gao et al., "Deep Learning for Tactile Understanding From Visual and Haptic Data", IEEE International Conference on Robotics and Automation (ICRA), 2016, pp. 536-543.
Yoshida et al., "VibVid: VIBration Estimation from VIDeo by using Neural Network", International Conference on Artificial Reality and Telexistence Eurographics Symposium on Virtual Environments (2017) http://www.hapis.k.u-tokyo.ac.jp/public/papers/17_ICAT-EGVE_yoshi.da.pdf.

(56) References Cited

OTHER PUBLICATIONS

Yoshiyuki Ohmura et al., "Conformable and Scalable Tactile Sensor Skin for Curved Surfaces", International Conference on Robotics and Automation, 2006, 1348-1353.
Osamu Osanai et al., "2-5. Skin firmness and sagging measurement," Anti-aging series 2, Forefront of anti-aging of skin, NTS Co., Ltd., Jul. 5, 2006 (21 pages).
Shota Ikawa et al., "Estimation of Pushing Force from Sequential Motion Images Based on Neural Network," (Aug. 31, 2017).
Di Guo et al: "A hybrid deep architecture for robotic grasp detection", 2017 IEEE International Conference on Robotics and Automation (ICRA), pp. 1609-1614, May 29, 2017.
Cecilia Laschi et al: "A Bio-inspired Neural Sensory-Motor Coordination Scheme for Robot Reaching and Preshaping", 2006 IEEE International Conference on Biomedical Robotics and Biomechatronics (BIOROB), pp. 531-536, Feb. 20, 2006.
Roberto Calandra et al., "More Than a Feeling: Learning to Grasp and Regrasp using Vision and Touch", (Dec. 4-8, 2017) 31st Conference on Neural Information Processing Systems NIPS17 Robot Learning; https://drive.google.com/file/d/1K2DORnCdwh7vik5oUlvnPLzyvkfMKgEE/view.

\* cited by examiner

TACTILE INFORMATION ESTIMATION APPARATUS, TACTILE INFORMATION ESTIMATION METHOD, AND PROGRAM

CROSS-REFERENCE TO RELATED APPLICATIONS

This application is continuation application of International Application No. JP2019/000971 filed on Jan. 15, 2019, which claims priority to Japanese Patent Application No. 2018-005151 filed on Jan. 16, 2018, the entire contents of which are incorporated herein by reference.

FIELD

The embodiments described herein relate to a tactile information estimation apparatus, tactile information estimation method, and non-transitory computer readable medium.

BACKGROUND

Recently, research regarding machine learning dealing with a plurality of pieces of information such as visual information, audio information, and operation information is widely conducted. Research regarding performance of control of an object by using information such as detection of force input from a tactile sensor is also widely conducted.

However, results of such research indicate that it is difficult to obtain tactile information from obtained visual information, which is an operation experientially performed by a human being such that, for example, a portion of an object which is unlikely to be slippery is determined from visual information. For this reason, it is a difficult task to make a robot perform an operation such as seeing an object, judging a portion of the object which is unlikely to be slippery, and grasping the object based on the judgment result, in a manner that a human being performs normally.

DETAILED DESCRIPTION

Figure 1:
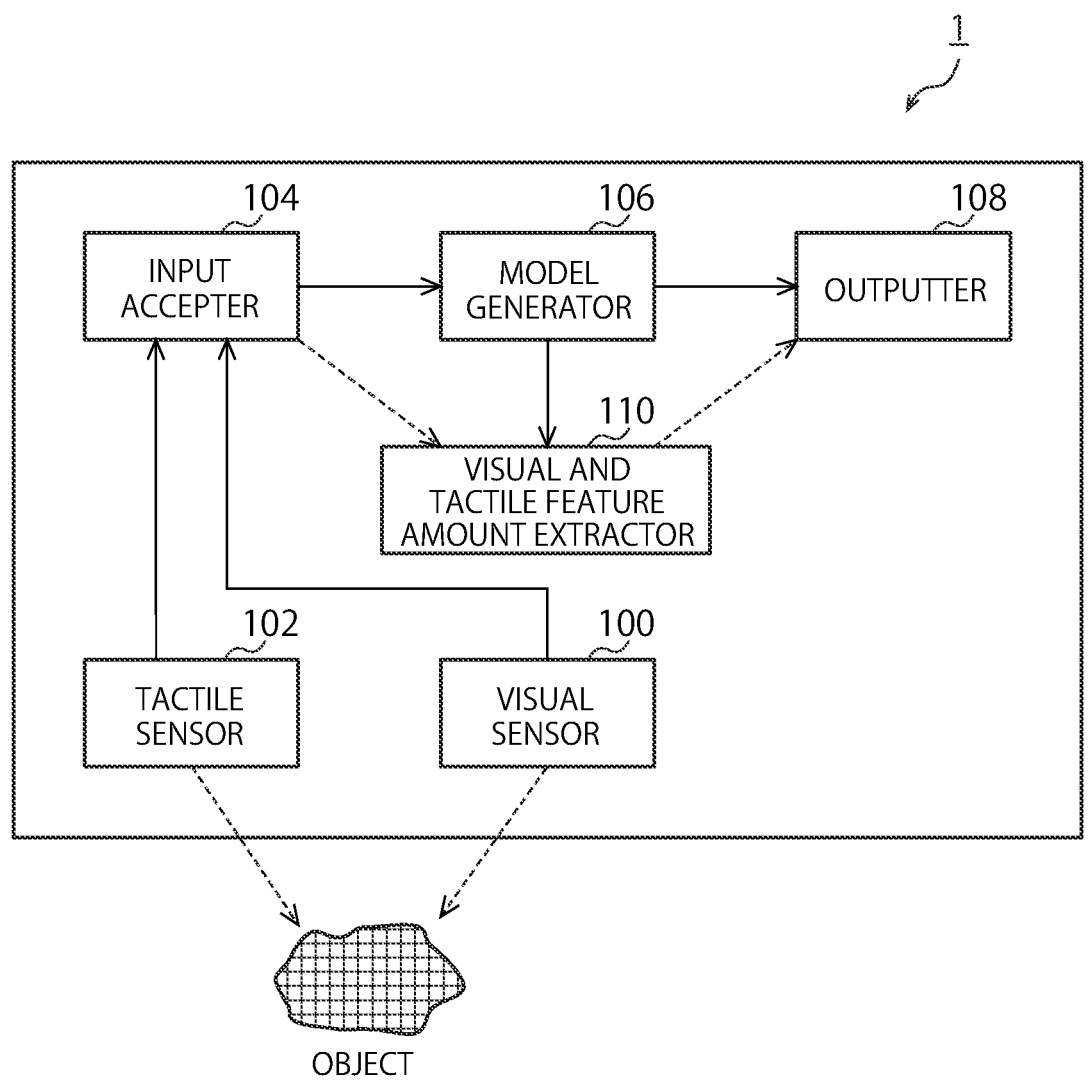
FIG. 1 is a block diagram illustrating functions of a tactile information estimation apparatus according to some embodiment.

According to some embodiments, a tactile information estimation apparatus may include one or more memories and one or more processors. The one or more processors are configured to execute to input at least first visual information of an object acquired by a visual sensor to a model generated based on visual information and tactile information linked to the visual information, and to extract a feature amount regarding tactile information of the object.

First Embodiment

The present embodiment explains a tactile information estimation apparatus which estimates and outputs tactile information when visual information is input thereto. This tactile information estimation apparatus may also be designed to output not only the result obtained by estimating the tactile information from the visual information but also a generation model generating the tactile information from the visual information. Hereinafter, explanation will be made in detail while referring to the drawings.

FIG. 1 is a block diagram illustrating functions of a tactile information estimation apparatus 1 according to the present embodiment. The tactile information estimation apparatus 1 includes a visual sensor 100, a tactile sensor 102, an input accepter 104, a model generator 106, an outputter 108, and a visual and tactile feature amount extractor 110.

The visual sensor 100 may acquire visual information of an object. For example, the visual sensor 100 may include a camera, acquire visual information of an object as image information, and input the information to the input accepter 104. The camera may acquire an image as a color image or one which acquires an image as a gray-scale image. Further, a device such as an RGB-D camera that acquires image information including depth information from the visual sensor 100 may also be mounted.

The tactile sensor 102 may acquire tactile information of an object. For example, the tactile sensor 102 may also include a plurality of pressure point sensors arranged in an array state. These pluralities of pressure point sensors may also be covered by soft silicone or the like so that it can sense a pressure as a plane. As another example, it is also possible to use a generally-distributed tactile sensor in a sheet shape or a film shape.

The tactile sensor 102 may also be, as still another example thereof, a sensor including a substance such as silicone having flexibility and permeability as a contact portion which is brought into contact with an object, photographing displacement of the contact portion using a camera or the like, and acquiring a pressure as a plane based on a state of the photographing. The camera which photographs the displacement may be a stereo camera, and it may also be a device capable of judging concavity and convexity of a surface through ultrasonic waves or the like.

As in the above-described example, the tactile sensor 102 may be a sensor capable of acquiring pressure information acquired as points, as pressure information of a plane. Further, the tactile sensor 102 may not necessarily be a sensor capable of acquiring pressure information as a plane at the same timing, but, it may also be a sensor capable of acquiring pressure information of one or more points, with which points on a plane of an object are scanned to sense pressure information at each point, and thereby pressure information as a plane can be acquired.

The tactile sensor 102 may be one which measures a pressure applied to the tactile sensor 102 from a surface of an object, as described above. As another example, the tactile sensor 102 may also be a sensor capable of measuring a repulsive force from the inside of the object.

The input accepter 104 may receive, in a learning phase of generating a model (which is simply described as a learning phase, hereinafter), the visual information sensed by the visual sensor 100 and the tactile information sensed by the tactile sensor 102, as sensor signals. The received sensor signals may be output to the model generator 106.

Note that at least one of the visual sensor 100 and the tactile sensor 102 may also be another device provided to the outside of the tactile information estimation apparatus 1. In this case, the input accepter 104 may receive signals from the outside visual sensor and/or the outside tactile sensor, and output the signals to the model generator 106. As described above, the input accepter 104 may also be designed to perform not only reception of the sensor signals in the tactile information estimation apparatus 1 but also acceptance of input of signals from the outside.

As another example, in a process of model generation, the visual sensor 100 and the tactile sensor 102 may also be designed to respectively input the sensed sensor signals to the model generator 106 with no aid of the input accepter 104. In addition, at least one of the visual sensor 100 and the tactile sensor 102 may also be provided as a part of the input accepter 104.

On the other hand, in an estimation phase of estimating tactile information (which is simply described as an estimation phase, hereinafter), the visual information may be input to the input accepter 104 from the visual sensor 100. As described above, the visual sensor 100 may be provided to the inside of the tactile information estimation apparatus 1, or it is also possible that visual information is input from the outside visual sensor. In addition, it is also possible that visual information is input from an outside file server or the like via a network or the like. The input visual information may be transmitted to the visual and tactile feature amount extractor 110.

The model generator 106 may generate, based on the input visual information and tactile information linked to the visual information, a model which, when the visual information and the tactile information are input thereto, outputs the visual information and the tactile information. This model may be a model generated based on a learning model such as, for example, CNN (Convolutional Neural Network) or FNN (Feedforward Neural Network). As another example, it is also possible to generate a model which, when the visual information is input thereto, outputs the tactile information.

As another example of the input/output information, the model to be generated may also be a model which, when the visual information and the tactile information are input thereto, outputs the tactile information, or a model which, when the visual information is input thereto, outputs the visual information and the tactile information.

As described above, the model to be generated may be one which is generated based on the visual information and the tactile information linked to the visual information, and in which the information regarding the visual and tactile feature amount being a feature amount linking the visual information and the tactile information is automatically generated through self-organization.

The model generator 106 may transmit the generated model to the outputter 108 and the visual and tactile feature amount extractor 110. Note that when the model is not used on the outside of the tactile information estimation apparatus 1, the generated model is not necessarily output to the outputter 108. In the learning phase, parameters such as loss and gradient of the generated model may be output from the outputter 108, to allow a user to check a learning status of the model.

In the learning phase, the outputter 108 may output the model output from the model generator 106 to the outside. By outputting the model to the outside as described above, it becomes possible to use the same model also in another tactile information estimation apparatus. On the other hand, in the estimation phase, the tactile information converted from the visual information, the visual and tactile feature amount, and so on may be output.

In the learning phase, the visual and tactile feature amount extractor 110 may acquire a self-organized visual and tactile feature amount based on the model generator 106, and generate a space where the visual and tactile feature amount is self-organized. The self-organized space may be different from normal classification, categorization, and the like, and may be a space formed in a manner that a state changes continuously or discretely along axes.

Figure 2:
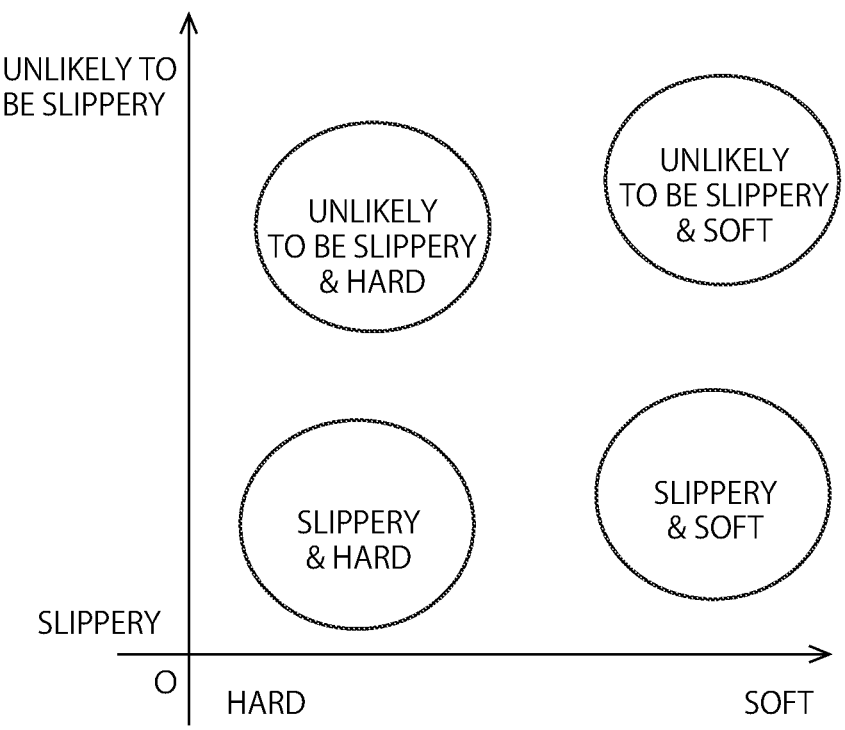
FIG. 2 is a diagram illustrating some example of a self-organized space according to some embodiments.

FIG. 2 is a diagram illustrating one example of visualizing the visual and tactile feature amount extracted by the visual and tactile feature amount extractor 110. In the example of FIG. 2, as a feature amount indicating a tactile sense, a relationship between slipperiness and hardness is represented. A vertical axis indicates the slipperiness, and indicates that the closer to an origin O, the more slippery, and the farther from the origin O, the more unlikely to be slippery. On the other hand, a horizontal axis indicates the hardness, and indicates that the closer to the origin O, the harder, and the farther from the origin O, the softer.

A result of adding the above explanation with respect to the axes is explanation in regions in the drawing. For example, in the drawing, a region close to the origin O is a region where an object is slippery and hard. A region which is far from the origin O in the vertical direction and close to the origin O in the horizontal direction is a region where the object is unlikely to be slippery and is hard. In like manner, a region where the object is slippery and soft, and a region where the object is unlikely to be slippery and is soft, exist as illustrated in the drawing.

In the illustration, although elliptical regions are illustrated, the feature amount may change continuously or discretely along the axes as described above, and these regions are not clearly distinguishable. Specifically, the self-organization performed by the visual and tactile feature amount extractor 110 is not general classification and categorization, and indices such as the hardness and the slipperiness may change along the axes.

In these classifications, the indices are not limited to the slipperiness and the hardness, and it is also possible to further provide another index as a tactile feature amount. When another index is provided, there is formed, not the space represented by the two dimensions, but a space representing a state of high dimensions of three dimensions or higher. Also when the two-dimensional space is employed, the indices are not limited to the slipperiness and the hardness, and appropriate indices may also be used according to purposes of information to be output.

Further, even the indices of the slipperiness and the hardness may not be able to be clearly expressed in the two-dimensional space, due to a dimension in an intermediate layer of the model generated by the model generator 106. In such a case, self-organization may be performed so that the indices of the slipperiness and the hardness can be expressed in the space of three dimensions or higher.

In a manner as described above, the visual and tactile feature amount extractor 110 may extract the self-organized visual and tactile feature amount based on the generated model.

In the estimation phase, for example, when the model generator 106 generates a model with an autoencoder, the visual and tactile feature amount extractor 110 may encode input visual information by using an encoder portion of the model. Subsequently, the visual and tactile feature amount extractor 110 may extract the visual and tactile feature amount based on which position in the self-organized space the encoded information exists. The extracted visual and tactile feature amount may be output via the outputter 108.

Figure 3:
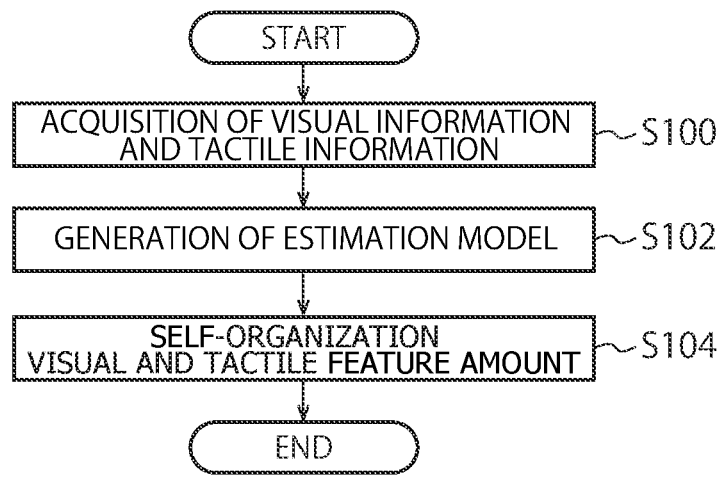
FIG. 3 is a flow chart illustrating a flow of a learning phase according to some embodiments.

Next, an operation of the learning phase will be explained by using a flow chart. FIG. 3 is a flow chart illustrating an operation in the learning phase of the tactile information estimation apparatus 1.

First, visual information and tactile information may be acquired from the visual sensor 100 and the tactile sensor 102, respectively, via the input accepter 104 (S100). For example, at a timing of acquiring tactile information of an object with the use of the tactile sensor 102, an image of the object may be acquired as visual information, and the visual information and the tactile information may be input to the tactile information estimation apparatus 1 via the input accepter 104. As described above, the visual sensor 100 and the tactile sensor 102 may also be designed to transmit the pieces of information acquired by the respective sensors to the model generator 106 with no aid of the input accepter 104.

As another example, it is also possible to design such that a user designates timings at which the visual sensor 100 and the tactile sensor 102 respectively sense the pieces of sensor information via the input accepter 104, to thereby acquire the visual information and the tactile information. In this case, the input accepter 104 may also be provided with a user interface which allows the user to input designation. As still another example, it is also possible to design such that previously-acquired visual information and tactile information linked to the visual information are input via the input accepter 104. The previously-acquired information may also be one stored in a file server or the like.

The visual sensor 100 is, for example, a camera, as described above, and an image photographed by the camera may be input from the input accepter 104 as visual information. When the image information is acquired in color, it may also be input by being converted into gray scale. Further, in order to eliminate the way of irradiation of light of illumination and the like, the image information may also be input after adjusting luminance, brightness, and chroma, or contrast, dynamic range, or the like for each region. As one example, the visual sensor 100 may acquire texture information of a surface of the object as visual information, and input the information to the input accepter 104. These pieces of pre-processing of learning are not limited to be performed by the visual sensor 100, but may also be performed by the input accepter 104 or another module.

As described above, the tactile sensor 102 may be a sensor including a plurality of pressure point sensors arranged in an array state, for example. In a case where the tactile sensor 102 is a sensor including a plurality of pressure point sensors as above, when the tactile sensor 102 is pressed against the object with a predetermined force, a result of combining pieces of data sensed by individual sensors may be input from the input accepter 104 as tactile information. More concretely, it is designed such that by two-dimensionally arranging pressure information sensed by each of the pressure point sensors when the tactile sensor 102 is pressed against the object with the predetermined force, pressure information as a plane may be sensed. In other words, it may be set that the pressure point sensor corresponds to a pixel in an image, and the pressure information as a plane is input as the tactile information.

Here, the predetermined force may also be, for example, an external force applied to the tactile sensor 102 from the object after the tactile sensor 102 senses that it is brought into contact with the object. As another example, when the tactile sensor 102 is provided to a finger of a gripper or the like, the predetermined force may also be a force applied to the tactile sensor 102 from the object when a distance between the fingers is controlled to a predetermined distance. As described above, the tactile sensor 102 may be able to perform sensing in a similar state in cases where it is brought into contact with various objects.

By designing as described above, it is possible to appropriately acquire tactile information regarding not only a hard object but also a soft object or an object which deforms.

In addition, it is also possible that the tactile sensor 102 is moved by a predetermined distance from the above-described state in a direction parallel to a direction in which the pressure points of the tactile sensor 102 are arranged, and sensing information of a pressure applied during the movement or sensing information of a pressure at a position after the movement, may be added as tactile information. By sensing the information acquired by moving the tactile sensor 102 by the predetermined distance as described above, it is also possible to acquire information regarding slipperiness of a surface of the object based on sensing of the respective pressure point sensors in the case of moving the tactile sensor 102 by the predetermined distance, other than hardness information acquired by applying the predetermined force. When the sensing information during the movement is acquired, it is also possible to acquire pressure information as tactile information by not only making the tactile sensor 102 move by the predetermined distance but also making the tactile sensor 102 move by applying the predetermined force thereto. When the sensing information during the movement is acquired, the tactile information may also be acquired as information along time series.

The information input from the tactile sensor 102 is not limited to this, and one pressure sensor may be used to set the information as tactile information, or when a sheet-shaped tactile sensor is used, tactile information sensed based on a specification of the tactile sensor may also be input from the input accepter 104.

As explained above, the visual information and the tactile information input to the input accepter 104 may become data of high dimensions represented by tensor (for example, vector or matrix) having elements of the number of pixels or the number of pressure points. When the information in the case where the tactile sensor 102 is moved by the predetermined distance is acquired as tactile information, learning may be performed by using two or more matrices having the number of elements of the number of pressure points, namely, a matrix in a state where the movement does not occur and a matrix in a state during the movement or after the movement, as tactile information. When the information along the time series during the movement is acquired, the tactile information to be input may be set to a three-dimensional matrix or a multichannel matrix.

Next, the model generator 106 may generate a model which, when the visual information and the tactile information are input thereto, outputs the visual information and the tactile information (S102). The model generator 106 may generate the model by using an autoencoder, for example. When the autoencoder is used, a network in which when the visual information and the tactile information are input to the model, the visual information and the tactile information can be acquired, may be generated through learning. The model to be generated may be a model based on CNN, or another network model such as FNN, as described above.

When visual information and tactile information are used for both input and output, it is also possible to implement CNN by using an image as the visual information, using pressure information acquired by the pressure point sensors as the tactile information, and setting these pieces of data to data of different channels. When the pressure information is acquired in time series, a generation model may be implemented as CNN in which the pieces of pressure information arranged in time series are respectively set to different channels, or it may be implemented so that the pieces of pressure information are input as a three-dimensional matrix, as described above. When another network is used, with respect to the pieces of data of the visual information and the tactile information, it is also possible to implement an input layer to which respective pixel values are input and an output layer from which respective pressure point values are output, for example.

In the learning, an activation function may be identity mapping or non-identity mapping. Further, as a loss function, a square error may be used, or another linear or nonlinear error function may also be used. The learning may also be designed to be performed by appropriately configuring mini-batch with respect to training data. As an algorithm of optimization, Momentum, Adam, or the like may be used, but, the algorithm is not limited to this, and another optimization algorithm may also be used.

As another example, it is also possible to generate a network which, when the visual information is input thereto, outputs the tactile information, as a model through learning. As the model, a model based on the network such as CNN or FNN may be generated, similarly to the above description. Further, in order to be able to extract a feature amount, it is also possible to configure a network having a layer whose dimensions are low such as two dimensions, in an intermediate layer. In this case, the model generator 106 may generate, for example, a model in which when visual information is input to an input layer, tactile information linked to the visual information is output, through performance of supervised learning.

As described above, it is also possible to generate a model being a model which, when the visual information and the tactile information are input thereto, outputs the tactile information, or a model which, when the visual information is input thereto, outputs the visual information and the tactile information, the model having a layer whose dimensions are low, as an intermediate layer. These models can also be generated through performance of supervised learning.

Next, the visual and tactile feature amount extractor 110 may extract a visual and tactile feature amount which links the visual information and the tactile information, based on the model generated by the model generator 106 (S104). This visual and tactile feature amount being a feature amount indicating that, for example, what kind of influence is exerted on the tactile information from the visual information input to the model may be extracted by acquiring the intermediate layer of the generated network.

The intermediate layer of the model generated in S102 may express, in low dimensions, the feature amount between the visual information and the tactile information. Accordingly, the visual and tactile feature amount extractor 110 may extract and output a space of self-organized visual and tactile feature amount based on the intermediate layer. Further, in this S104, the visual and tactile feature amount extractor 110 may also generate a model which, when the visual information is input thereto, outputs the tactile information.

When, as one example, the model generator 106 generates a model using an autoencoder based on CNN, namely, when it generates a model using a so-called convolutional autoencoder, the visual and tactile feature amount extractor 110 may acquire an intermediate layer being a layer of a code portion in the model. The acquired intermediate layer may be a layer indicating a compressed and low-dimensional feature amount, when compared to data of high dimensions (e.g., the number of pixels, the number of pressure points), being the visual information and the tactile information to be input to the model. The model generator 106 may also generate a model so that the feature amount can be visualized by compressing the dimensions in the intermediate layer to low dimensions of two dimensions, three dimensions, or the like. In this case, the visual and tactile feature amount extractor 110 may extract this intermediate layer, to thereby extract the self-organized feature amount.

The model generated by the model generator 106 is not required to be generated to make the intermediate layer have low dimensions such as two dimension as described above, and it may also be generated to have an intermediate layer of higher dimensions such as 16×16 dimensions. When the dimensions of the intermediate layer is not as low as two dimensions or the like as above, it is also possible to design such that the visual and tactile feature amount extractor 110 extracts the intermediate layer of the generated model, and it generates an encoder which compresses a dimension to low dimensions by an autoencoder to make inputs and outputs with respect to this intermediate layer match, to thereby extract the visual and tactile feature amount.

The low-dimensional feature amount is represented as in FIG. 2, for example. In FIG. 2, the slipperiness and the hardness form the space along two-dimensional axes. The visual and tactile feature amount extractor 110 may make the feature amount to be self-organized, to thereby form the space in which indices of these are set to the axes. As described above, this space is not required to be the two-dimensional space, and it may also be formed as a space whose dimensions are three dimensions or higher.

For example, when, in a state where the tactile sensor 102 and an object are brought into contact with each other, at least a part of the tactile sensor 102 is moving while having a velocity with respect to the object, namely, the tactile sensor 102 is moving so as to trace a surface of the object, as one example, data which is acquired by the tactile sensor 102 may become information along time series. In this case, it becomes possible to acquire the tactile information in which the hardness is a component in a normal direction and the slipperiness is a component in a plane direction. By acquiring the tactile information in a manner as described above, the visual and tactile feature amount in which the hardness and the slipperiness are taken into consideration may be mapped through self-organization.

As another example, an encoder portion in the convolutional autoencoder may be used, and in the autoencoder, various feature amounts may be extracted in an encode layer. It is also possible to perform mapping of the indices of the hardness and the slipperiness based on this encode layer. The visual and tactile feature amount extractor 110 may also use this encoder layer to generate a new network through learning of FNN and extract the feature amount. In this case, supervised learning may also be performed in the generation of new network, and by designing as above, it is possible to explicitly extract the feature amount regarding the hardness and the slipperiness.

In any of the above-described cases, it is also possible to perform fine tuning by using the model generated by the model generator 106. The visual and tactile feature amount extractor 110 may also generate a new model which, when the visual information is input thereto, extracts the visual and tactile feature amount such as the hardness and the slipperiness, through performance of fine tuning by using the generated model.

As described above, it is possible to extract the visual and tactile feature amount in which the hardness and the slipperiness are set as the indices, through the self-organization, from the visual information and the tactile information acquired by forming the autoencoder of CNN without explicit labeling performed by a user, and further, it is also possible to explicitly extract the visual and tactile feature amount in which the hardness and the slipperiness are set as the indices, through execution of supervised learning using the self-organized intermediate layer.

Note that the space of the self-organized feature amount is not limited to information which is clearly understood by a human being such as the hardness and the slipperiness. However, when the tactile sensor 102 acquires information such as one including the hardness and the slipperiness with respect to the visual information as described above, it becomes possible to form, through the self-organization, the self-organized space including the hardness and the slipperiness as indices of some kind.

Specifically, it is not essential to form the visual and tactile feature amount as a space as in FIG. 2, and when a two-dimensional space is formed, for example, the space may be formed in which both a horizontal axis and a vertical axis indicate indices which cannot be directly sensed by a human being (for example, indices in which the hardness and the slipperiness are linearly or nonlinearly combined with respect to the visual information). In other words, the self-organized visual and tactile feature amount is not always an index which can be clearly understood by a human being as a tactile sense when being expressed as a numerical value, and it may also be an index which cannot be sensuously understood by a human being.

The visual and tactile feature amount extractor 110 may store the space of the self-organized visual and tactile feature amount or the model of extracting the visual and tactile feature amount generated as above. It may be stored not only in the visual and tactile feature amount extractor 110 but also in a storer (not illustrated) in the tactile information estimation apparatus 1. As another example, the generated visual and tactile feature amount extraction model may also be output via the outputter 108 to allow another tactile information estimation apparatus to use the model.

In the learning phase, by performing the learning in a manner as described above, the model which, when visual information and tactile information are input thereto, outputs the visual information and the tactile information, may be generated, and based on the generated model, the space of the self-organized visual and tactile feature amount which, when the visual information is input thereto, outputs the tactile information, may be extracted.

Figure 4:
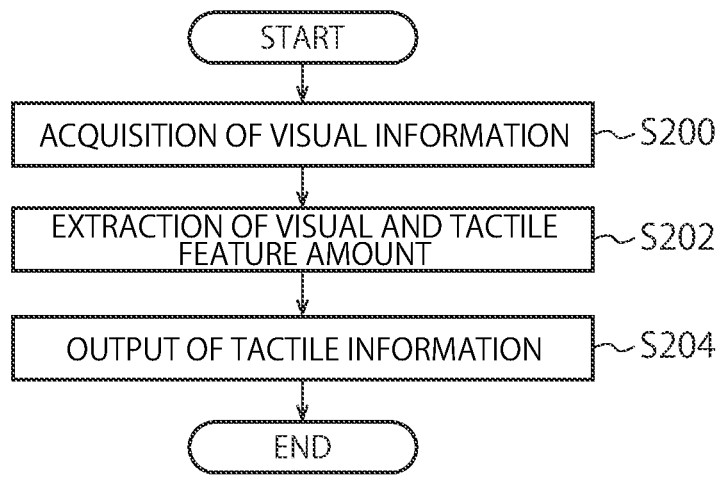
FIG. 4 is a flow chart illustrating a flow of an estimation phase according to some embodiments.

Next, an estimation phase will be explained by using a flow chart. FIG. 4 is a flow chart illustrating a flow of processing of the estimation phase in which a visual and tactile feature amount is extracted from visual information.

In the estimation phase, data is transmitted/received as indicated by dotted lines in FIG. 1.

First, visual information may be acquired via the input accepter 104 (S200). As the visual information, for example, visual information sensed by the visual sensor 100 may be input to the tactile information estimation apparatus 1 via the input accepter 104. Other than the above, data including visual information acquired on the outside may also be input to the input accepter 104. The visual information to be input may be visual information of an object different from the object used when performing learning, for example.

Next, the visual and tactile feature amount extractor 110 may extract a visual and tactile feature amount from the input visual information (S202). Based on the self-organized space or the model of extracting the visual and tactile feature amount prepared in the learning phase, the visual and tactile feature amount extractor 110 may acquire tactile information from the input visual information.

The visual and tactile feature amount extractor 110 may use the model generated by the model generator 106 and the space of the self-organized visual and tactile feature amount extracted by the visual and tactile feature amount extractor 110, to acquire the tactile information from the visual information. For example, the visual and tactile feature amount extractor 110 may input the visual information to the model generated by the model generator 106, and acquire an output in an intermediate layer. After that, the visual and tactile feature amount extractor 110 may acquire on which coordinates in the space of the visual and tactile feature amount the acquired output of the intermediate layer is mapped. Subsequently, the visual and tactile feature amount extractor 110 may acquire the tactile information based on the mapped output of the intermediate layer.

Next, the outputter 108 may output the tactile information acquired by the visual and tactile feature amount extractor 110 (S204). For example, by making a grasp part such as a gripper connected to a robot operate based on the output tactile information, it becomes possible to grasp an object based on the tactile information.

As another example, it is also possible that the tactile information is previously converted into a signal for controlling the grasp part in the tactile information estimation apparatus 1 and output to the robot, or the tactile information estimation apparatus 1 is provided with a grasp part, and a control signal is output to the grasp part, to thereby control the grasp part. The grasp part provided to the tactile information estimation apparatus 1 may also be a gripper or the like to which the tactile sensor 102 is provided.

As described above, according to the present embodiment, by making the input visual information and tactile information to be self-organized, it becomes possible to allow a user to acquire the tactile information from the input visual information without performing labeling or the like. In a manner as above, when the user acquires the tactile information by using the self-organized feature amount through learning without performing labeling, it becomes possible to acquire tactile information of an unknown object whose visual information is obtained.

In addition, according to the present embodiment, as the tactile information, not categorized or labeled values but the indices such as, for example, the hardness and the slipperiness may be output as numerical values, so that it becomes possible to output indices of making the grasp part or the like of the robot perform a more precise operation. Specifically, it becomes possible to control the force for operating the grasp part or the like of the robot at a higher accuracy, without being based on a rough index such that the object is hard or the object is soft, and thus it is possible to grasp various objects based on tactile information of the objects.

For example, it is possible to grasp an object whose shape and material are decided in a factory or the like. It is also possible that tactile information of an object whose shape, hardness, and the like are difficult to be modeled such as a cloth or a pouch that is deformed by a grasp force, an object which is costly to be modeled such as foodstuffs of weekly packed lunch for sale, an object which is likely to have an individual difference, and the like, can also be estimated, with good accuracy, by the tactile information estimation apparatus 1 according to the present embodiment.

Second Embodiment

Figure 5:
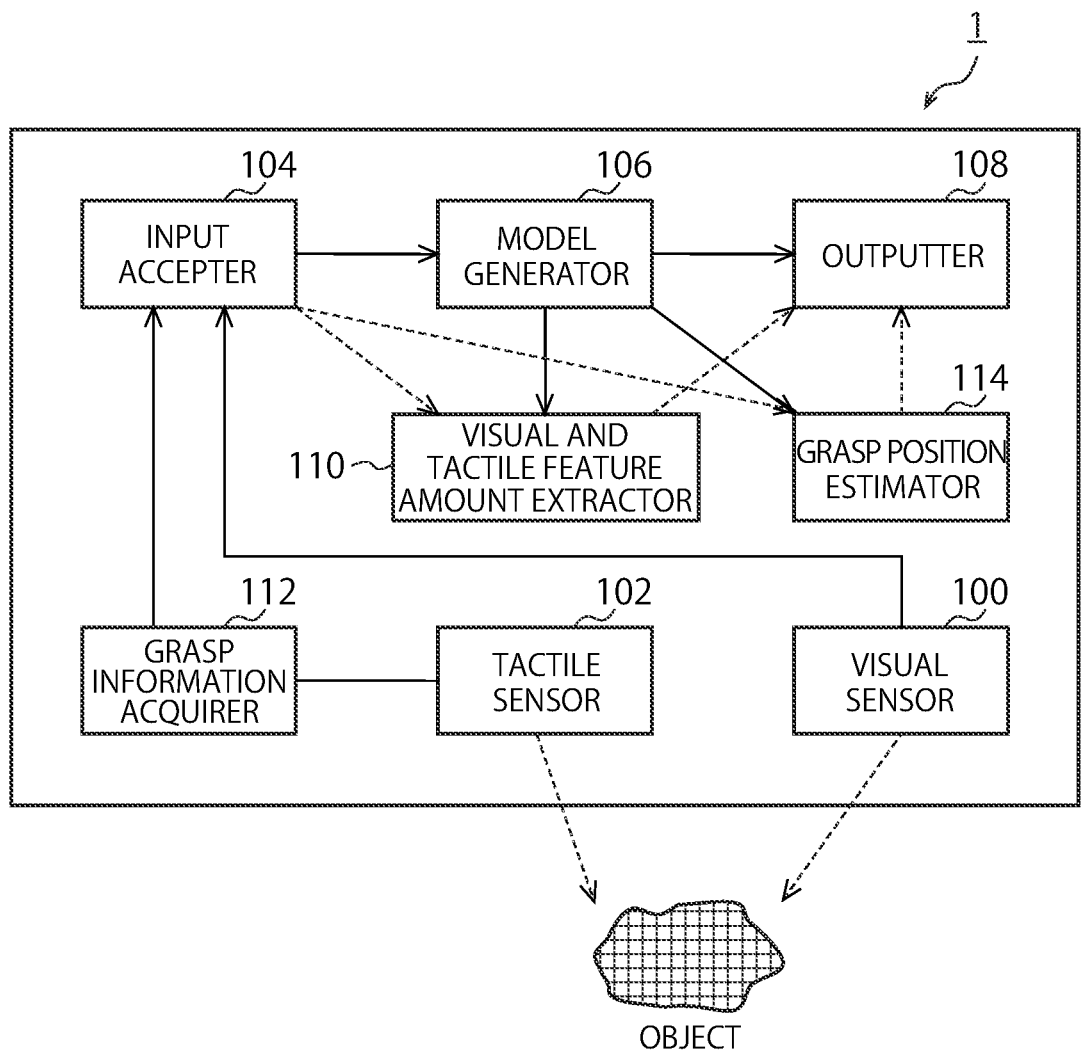
FIG. 5 is a block diagram illustrating functions of a tactile information estimation apparatus according to some embodiments.

FIG. 5 is a block diagram illustrating functions of a tactile information estimation apparatus 1 according to the present embodiment. In addition to the functions of the tactile information estimation apparatus 1 according to the first embodiment described above, a grasp information acquirer 112 is further provided.

The grasp information acquirer 112 may be provided with a gripper capable of grasping an object, for example. The grasp information acquirer 112 may grasp an object, and the visual sensor 100 may sense a grasp state as visual information. In the state of grasping the object as described above, information of the object and a grasp position may be acquired as the visual information, and the acquired visual information may be transmitted to the model generator 106 via the input accepter 104. It is also possible that information regarding whether or not the object is being stably grasped is transmitted by being linked to this visual information. It is also possible that grasp is tried to be performed at various positions with respect to a shape of an object, namely, a grasp state of the object is changed, to acquire visual information, tactile information, and information regarding whether or not the object can be grasped, and the pieces of information are set as training data.

For example, it is also possible to allow a user to input whether or not the object is being grasped, via the input accepter 104. As another example, it is also possible that a scale is provided to the grasp information acquirer 112, and it may be judged whether or not a state of lifting the object can be maintained. It is also possible to judge whether or not the state of lifting the object can be maintained, by moving a portion where the object is grasped by the grasp information acquirer 112 in a direction opposite to a direction of gravity, and grasping a situation such that a state where gravity information indicates a predetermined value (e.g., weight of the object) is continued for predetermined number of seconds or a state where the gravity information does not change from the predetermined value even if the portion is moved by a predetermined distance is continued.

Based on this visual information, the model generator 106 may perform learning regarding the grasp position, and generate a grasp position model regarding a position where the object can be stably grasped. This grasp position model may be generated as a model different from the model for extracting the visual and tactile feature amount described above. The grasp position model can perform learning based on various learning methods and various models. For example, it is also possible to perform supervised learning in which a shape and a grasp position of an object are input from an input layer as visual information, and an output layer outputs whether or not the object can be grasped. As another example, it is also possible to generate a model which, when a shape of an object is input thereto, outputs information indicating at which position the object is easily grasped. In this case, not only two-dimensional information but also three-dimensional information may also be acquired.

In the learning phase, the model generator 106 may transmit the learned grasp position model to a grasp position estimator 114. The grasp position estimator 114 may store the received grasp position model. In the estimation phase, the grasp position estimator 114 may estimate the grasp position from the visual information in accordance with the stored grasp position model, and output the grasp position via the outputter 108.

Further, a gripper may also be provided with the tactile sensor 102, at a place of grasping the object. When the tactile sensor 102 is provided, the grasp information acquirer 112 may also input tactile information sensed by the tactile sensor 102 to the model generator 106 via the input accepter 104. By providing the tactile sensor 102 to the grasp information acquirer 112, it becomes possible to acquire a grasp position and tactile information, and data obtained by linking those and visual information at the same timing.

Figure 6:
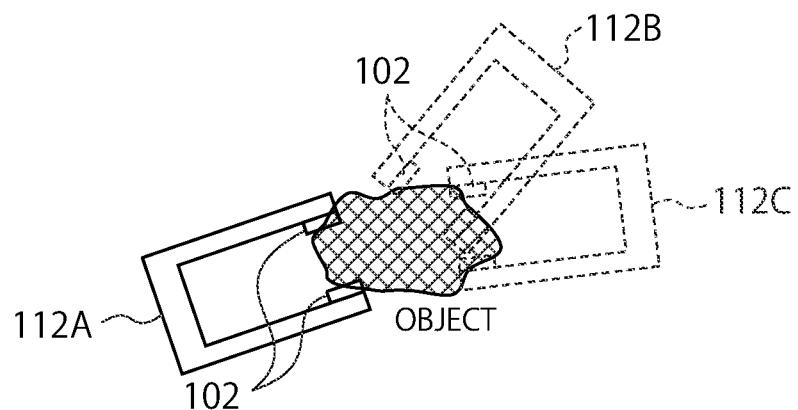
FIG. 6 is a diagram schematically illustrating a state of grasping an object.

FIG. 6 schematically illustrates the grasp information acquirer 112 provided with the tactile sensor 102. For example, it is set that when the grasp information acquirer 112 is at a position 112A, it is possible to grasp an object, and when the grasp information acquirer 112 is at a position 112B and a position 112C, it is not possible to grasp the object.

At the position 112A, the grasp information acquirer 112 may transmit information indicating that the object can be grasped and tactile information of the object to the input accepter 104, and at the same timing, the visual sensor 100 may transmit visual information to the input accepter 104. As described above, the position at which the object can be grasped, the tactile information, and the visual information linked to those may be input to the model generator 106.

On the other hand, at the position 112B and the position 112C, the grasp information acquirer 112 may transmit information indicating that the object cannot be grasped. In this case, tactile information may be transmitted based on data in a state where the object and the tactile sensor 102 were brought into contact with each other. From the visual sensor 100, sensing information in a state where the tactile sensor 102 is brought into contact with the object may be transmitted.

For example, at a stage where the object and the grasp information acquirer 112 are brought into contact with each other, the visual sensor 100 may perform photographing, and the tactile sensor 102 may acquire tactile information. After that, as described above, in order to judge whether or not the object can be grasped at the position, the grasp information acquirer 112 is arbitrarily moved to grasp the grasp situation. After grasping the grasp situation, each of grasp-capable information detected by the grasp information acquirer 112 and the tactile information sensed by the tactile sensor 102, and the visual information sensed by the visual sensor 100 may be linked to be transmitted. By designing as above, in both the above-described two cases, namely, the case where the object can be grasped and the case where the object cannot not be grasped, it becomes possible to transmit the pieces of information from the respective sensors through the same control.

In the estimation phase, when visual information is input, the visual information may be input to the visual and tactile feature amount extractor 110 and the grasp position model generated by the model generator, and the visual and tactile feature amount and information indicating at which position the object can be grasped, may be output. As described above, by inputting texture data of the object to the visual and tactile feature amount extractor 110 and inputting shape data of the object to the grasp position model, it becomes possible to acquire that at which position the object is easily grasped, and acquire information regarding that what degree of force should be used to grasp the object.

As described above, according to the present embodiment, by performing modeling by not only linking the tactile information and the visual information but also linking the grasp-capable information based on the shape of the object to the visual information, it becomes possible to output both the force and the position to be controlled when performing the grasp, from the texture information and the shape information included in the visual information.

Figure 7:
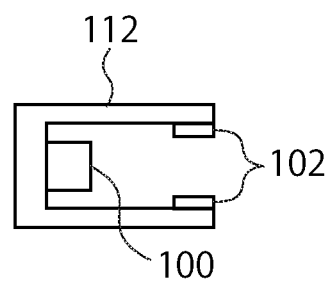
FIG. 7 is a diagram schematically illustrating a grasp information acquirer according to some embodiments.

Note that in the above description, there is no particular limitation regarding the position of the visual sensor 100. For example, the visual sensor 100 at a fixed position may be employed as in the above-described situation, but, it is not limited to this. FIG. 7 is a diagram illustrating another example regarding the position of the visual sensor 100.

As illustrated in FIG. 7, the visual sensor 100 may also be provided to the grasp information acquirer 112. When the visual sensor 100 is provided to the grasp information acquirer 112 as described above, it also becomes possible to acquire the grasp position information and the tactile information with higher accuracy.

For example, when the visual sensor 100 is provided as in FIG. 7, the shape information and the grasp position information of the object can be acquired by being linked to each other, and besides, the visual information based on the position of the tactile sensor 102 can be acquired, so that it becomes possible to more correctly acquire the texture information at a portion with which the tactile sensor 102 is brought into contact, with respect to the sensing information of the tactile sensor 102.

In this case, when acquiring the visual information, a timing at which the shape information is acquired and a timing at which the texture information is acquired may be deviated. Specifically, it is also possible to design such that the shape information is acquired at a position at which the information of the entire object can be acquired, and the texture information is acquired in a state where the tactile sensor 102 and the object are brought into contact with each other.

In the learning phase, based on the information of the visual information and the like acquired in a manner as above, learning of the grasp position based on the shape, and the visual and tactile feature amount based on the texture may be performed.

In the estimation phase, the visual information of the shape of the entire object may be first acquired, the grasp position may be estimated, and after that, the texture information at the place where the grasp is performed at the grasp position may be acquired, and the visual and tactile feature amount may be estimated. It is also possible to provide a configuration in two stages, as described above.

However, similarly to the case where the visual sensor 100 is fixed, it is not essential to acquire the visual information in two stages in both the learning phase and the estimation phase, and it is also possible that the visual information of the entire object is acquired as the visual information, and even the texture information is acquired from the acquired visual information.

Third Embodiment

Figure 8:
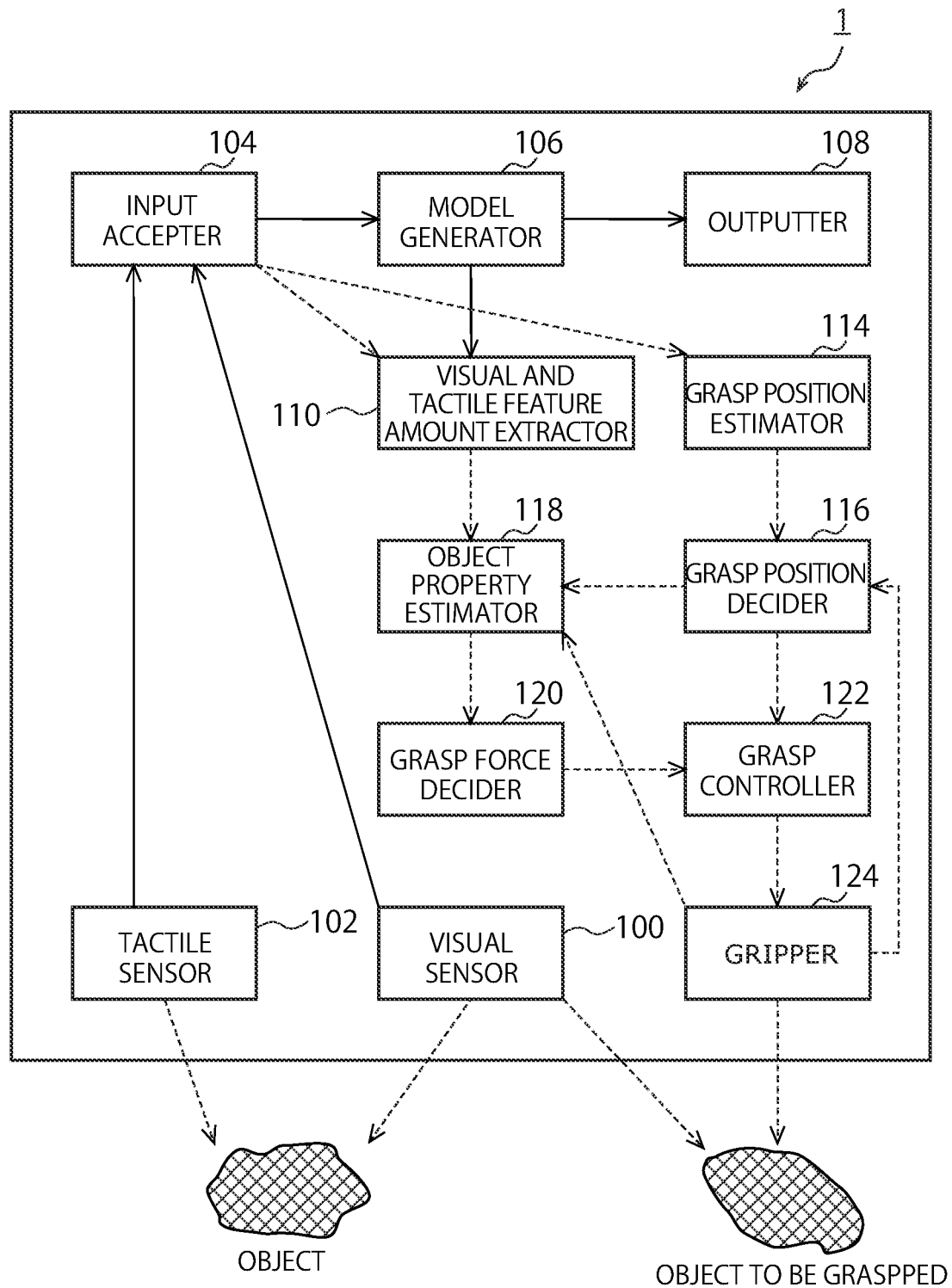
FIG. 8 is a block diagram illustrating functions of a tactile information estimation apparatus according to some embodiments.

FIG. 8 is a block diagram illustrating functions of a tactile information estimation apparatus 1 according to the present embodiment. The tactile information estimation apparatus 1 further includes a grasp position decider 116, an object property estimator 118, a grasp force decider 120, a grasp controller 122, and a gripper 124.

The grasp position decider 116 may decide a grasp position based on a grasp position estimated by the grasp position estimator 114. The grasp position estimator 114 may estimate the grasp position based on a grasp position model generated as in the above-described second embodiment, or it may also estimate the grasp position from visual information through another different method. Further, when there is feedback on information from the gripper 124, the position of grasping the object may be updated based on the feedback information.

The object property estimator 118 may estimate the property of the object from the visual and tactile feature amount extracted by the visual and tactile feature amount extractor 110. Further, the object property estimator 118 may also estimate the property at the portion of the object where the object is grasped, based on not only the visual and tactile feature amount but also the grasp position decided by the grasp position decider 116. Further, when there is feedback on information from the gripper 124, the property of the object may be updated based on the feedback information. When updating the property of the object, conversion information from the visual and tactile feature amount output by the visual and tactile feature amount extractor 110 into the property of the object, may also be updated as well.

The grasp force decider 120 may decide a grasp force based on the property of the object estimated by the object property estimator 118.

The grasp position decider 116 and the grasp force decider 120 may also output the decided grasp position and grasp force from the outputter 108, to thereby make a grasp device on the outside grasp an object to be grasped, namely, an object to be grasped being an object different from the object used for learning. When the tactile information estimation apparatus 1 is provided with the gripper 124 as illustrated in FIG. 8, it is also possible that the grasp position and the grasp force are not output to the outside but are output to the grasp controller 122.

The grasp controller 122 may output a signal for controlling the gripper 124 to the gripper 124, based on the grasp position decided by the grasp position decider 116 and the grasp force decided by the grasp force decider 120. Note that the grasp controller 122 is not an essential configuration, and it is also possible that the grasp position decider 116 and the grasp force decider 120 directly output information to the gripper 124, and the gripper 124 may generate the control signal to be operated. As another example, it is also possible that the grasp position decider 116 and the grasp force decider 120 respectively generate control signals to make the gripper 124 operate.

The gripper 124 may grasp an object to be grasped being another object to be actually grasped, and give feedback on information regarding a grasp state of the object to the grasp position decider 116 and/or the object property estimator 118.

An operation in a learning phase may be similar to that of the above-described each embodiment. Further, although the grasp information acquirer 112 in the second embodiment is omitted in FIG. 8, the grasp information acquirer 112 may also be provided. Hereinafter, an operation in an estimation phase will be described.

Figure 9:
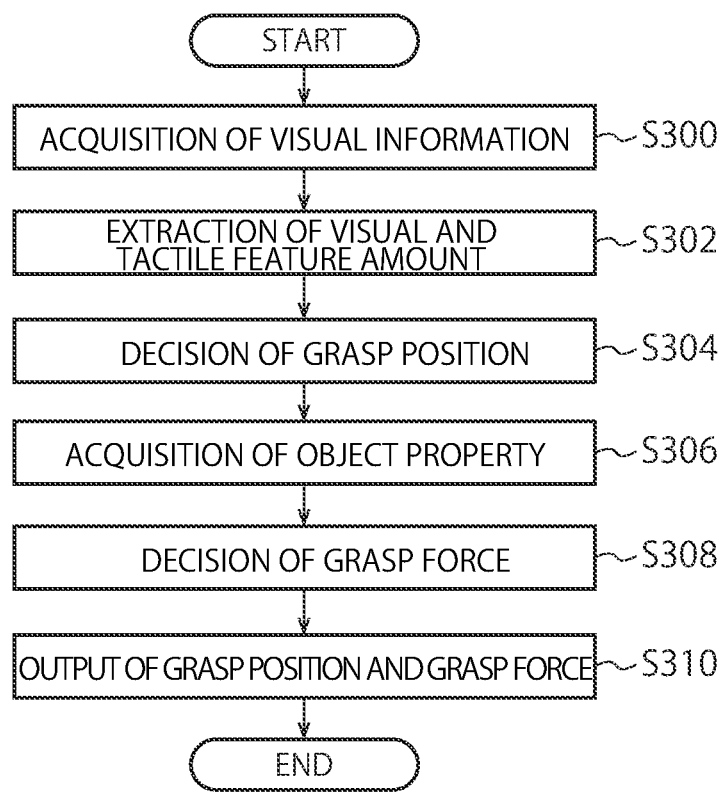
FIG. 9 is a flow chart illustrating a flow of an estimation phase according to some embodiments.

FIG. 9 is a flow chart illustrating an operation in the estimation phase according to the present embodiment.

First, the visual sensor 100 may acquire visual information of an object to be grasped, and input the visual information to the visual and tactile feature amount extractor 110 and the grasp position estimator 114 via the input accepter 104 (S300). Next, the visual and tactile feature amount extractor 110 may use a generated model to extract a visual and tactile feature amount from the visual information (S302).

The grasp position estimator 114 may estimate a position where the object to be grasped can be grasped, from the input visual information, and the grasp position decider 116 may decide a grasp position of the object to be grasped from the grasp-capable position estimated by the grasp position estimator 114 (S304). For example, the grasp position estimator 114 may perform estimation by digitizing an index such that to what degree the grasp can be performed at a plurality of grasp-capable positions, and based on the digitized index, the grasp position decider 116 may decide the most suitable grasp-capable position. When the grasp information acquirer 112 is provided and a grasp position model is already generated in the model generator 106, the grasp position may be estimated to be decided by using the grasp position model.

The object property estimator 118 may estimate the property of the object based on the visual and tactile feature amount extracted by the visual and tactile feature amount extractor 110 (S306). The property of the object is, for example, a property which is used for grasping the object and in which both the hardness and the slipperiness based on the extracted visual and tactile feature amount are taken into consideration. As one example, the property of the object may indicate a value acquired by performing predetermined conversion based on a numerical value of the feature amount of the hardness and the slipperiness. The predetermined conversion may be previously-defined conversion, and it may also be conversion as a result of learning the defined conversion through reinforcement learning or the like.

As described above, the self-organized visual and tactile feature amount in the intermediate layer of the model generated by the model generator 106 is not always information which can be sensuously understood by a human being. In such a case, the object property estimator 118 may calculate a property of the object which is used for calculating a force necessary for grasping the object, from a visual and tactile feature amount regarding which it is difficult that what kind of sense or tactile sense can be directly sensed by a human being. As described above, the self-organized visual and tactile feature amount may be a feature amount capable of extracting the property of the object capable of being converted into a force to be added for grasping the object.

Further, the object property estimator 118 may also estimate the property of the object based on not only the visual and tactile feature amount but also the grasp position estimated by the grasp position estimator 114 in S306. For example, it is also possible that at the grasp-capable position estimated by the grasp position estimator 114, the property of the object is estimated from texture information of an object to be grasped at a place where the gripper 124 and the object to be grasped are brought into contact with each other.

Next, the grasp force decider 120 may decide a grasp force being a force to be added when performing the grasp, from the estimated property of the object (S308). The estimated property of the object may be obtained by digitizing the property based on both the hardness and the slipperiness, for example, as described above, and the grasp force decider 120 may decide the grasp force from the digitized value. To put it the other way around, a result of digitizing the hardness and the slipperiness in order to decide the grasp force may be the property of the object, and the object property estimator 118 may estimate a property value for deciding the grasp force from the extracted visual and tactile feature amount.

The outputter 108 may output the grasp position decided by the grasp position decider 116 and the grasp force decided by the grasp force decider 120 (S310). As described above, the tactile information estimation apparatus 1 according to the present embodiment may decide and output the grasp position and the grasp force when the visual information of the object to be grasped is input thereto. By performing the output as above, it becomes possible to output, not an abstract value such as the visual and tactile feature amount, but more concrete information used for controlling a grasp device such as a gripper.

Figure 10:
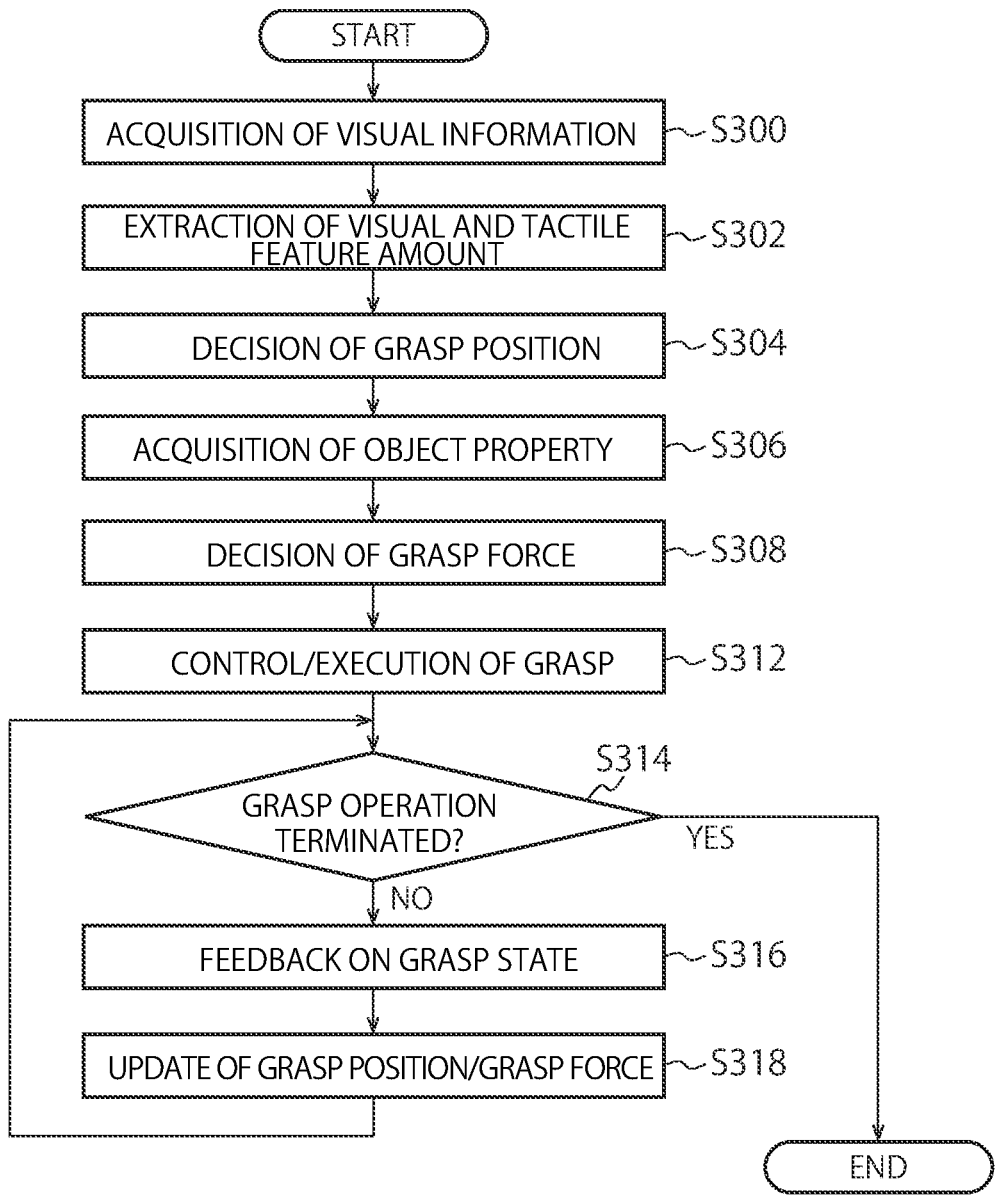
FIG. 10 is a flow chart illustrating a flow of an estimation phase according to some embodiments.

FIG. 10 is a flow chart illustrating one example of an operation of the tactile information estimation apparatus 1 when the gripper 124 is provided. When the gripper 124 is provided, the gripper 124 may actually grasp an object to be grasped, and the grasp state may be feedback, to thereby further increase an accuracy of deciding the grasp position and the grasp force.

An operation up to the decision of grasp force in S308 may be similar to the operation illustrated in the aforementioned FIG. 9. Specifically, when the tactile information estimation apparatus 1 acquires visual information of an object to be grasped, it may execute decision of a grasp position and decision of a grasp force.

Next, the grasp controller 122 may control the gripper 124, to thereby execute a grasp operation (S312). The grasp controller 122 may generate a control signal with which the gripper 124 operates at the decided grasp position and with the decided grasp force, and transmit the control signal to the gripper 124. The gripper 124 may operate based on the control signal received from the grasp controller 122, to thereby execute the grasp of the object to be grasped.

Next, the grasp controller 122 may judge whether or not the grasp operation has been terminated (S314). When the grasp operation has been terminated (S314: Yes), the operation of the tactile information estimation apparatus 1 may be terminated.

On the other hand, when the grasp operation has not been terminated (S314: No), the gripper 124 may give feedback on the information of the grasp state to the grasp position decider 116 and/or the object property estimator 118 (S316). The information to be feedback is, for example, information regarding whether or not the object is being stably grasped, or information such as sensing information of a tactile sensor when the tactile sensor is provided to the gripper 124.

Next, the grasp position decider 116 and/or the object property estimator 118 may update various kinds of information used for controlling the gripper 124 based on the feedback information (S318).

For example, the grasp position decider 116 may decide the grasp position from the shape of the object to be grasped, but, when this decision is not appropriate, the grasp position decider 116 may update the grasp position. The update of the grasp position may also be performed by using reinforcement learning, for example.

When the reinforcement learning is used, as one example, reward is set regarding grasp stability, and leaning is performed based on MDP (Markov Decision Process). The reward may be set according to a load situation of an object to be grasped when the object is lifted by a predetermined distance, similarly to the above-described embodiment, or when the gripper 124 is provided with a tactile sensor, the reward may also be set according to a state of the tactile sensor. It is also possible to use, not the MDP, but semi-Markov decision process. When information of a portion of the object to be grasped which cannot be sensed by the visual sensor 100 is wanted to be used, partially observable Markov decision process may also be used. The method of reinforcement learning is not limited to those described above, and it may be one capable of performing learning appropriately.

This reinforcement learning may also be performed for not only the decision of the grasp position but also the decision of the grasp force. For example, the object property estimator 118 may update the property information of the object through reinforcement learning based on the feedback information from the gripper 124. The grasp force decider 120 may update the grasp force based on the property information of the object updated by the object property estimator 118.

The update of the information may also be reflected on various kinds of models generated by the model generator 106. Specifically, it is also possible to update a network by setting the information obtained by the reinforcement learning as supervised data, with respect to the generated model. In this case, in a case where an additional unknown object is tried to be grasped, it becomes possible to improve accuracy of the extraction of the visual and tactile feature amount, the estimation of the object property, or the estimation of the grasp position in the visual and tactile feature amount extractor 110, the object property estimator 118, or the grasp position estimator 114.

As described above, according to the present embodiment, by updating the grasp position and the grasp force, it is also possible to appropriately update the grasp position and the grasp force at a point of time at which the object to be grasped is started to be grasped. Further, it is also possible to appropriately update the grasp force during the performance of grasp. By appropriately updating the grasp position and the grasp force, it becomes possible to grasp the object more precisely.

Note that the gripper 124 is not necessarily provided to the tactile information estimation apparatus 1, and it may also be a device such as a gripper which exists on the outside and which is connected to the tactile information estimation apparatus 1. Further, the feedback information may not be transmitted from the gripper 124, but it is also possible to design such that the visual sensor 100 senses visual information of the gripper 124 or a device such as a gripper on the outside, and transmits feedback information based on the visual information.

Fourth Embodiment

Figure 11:
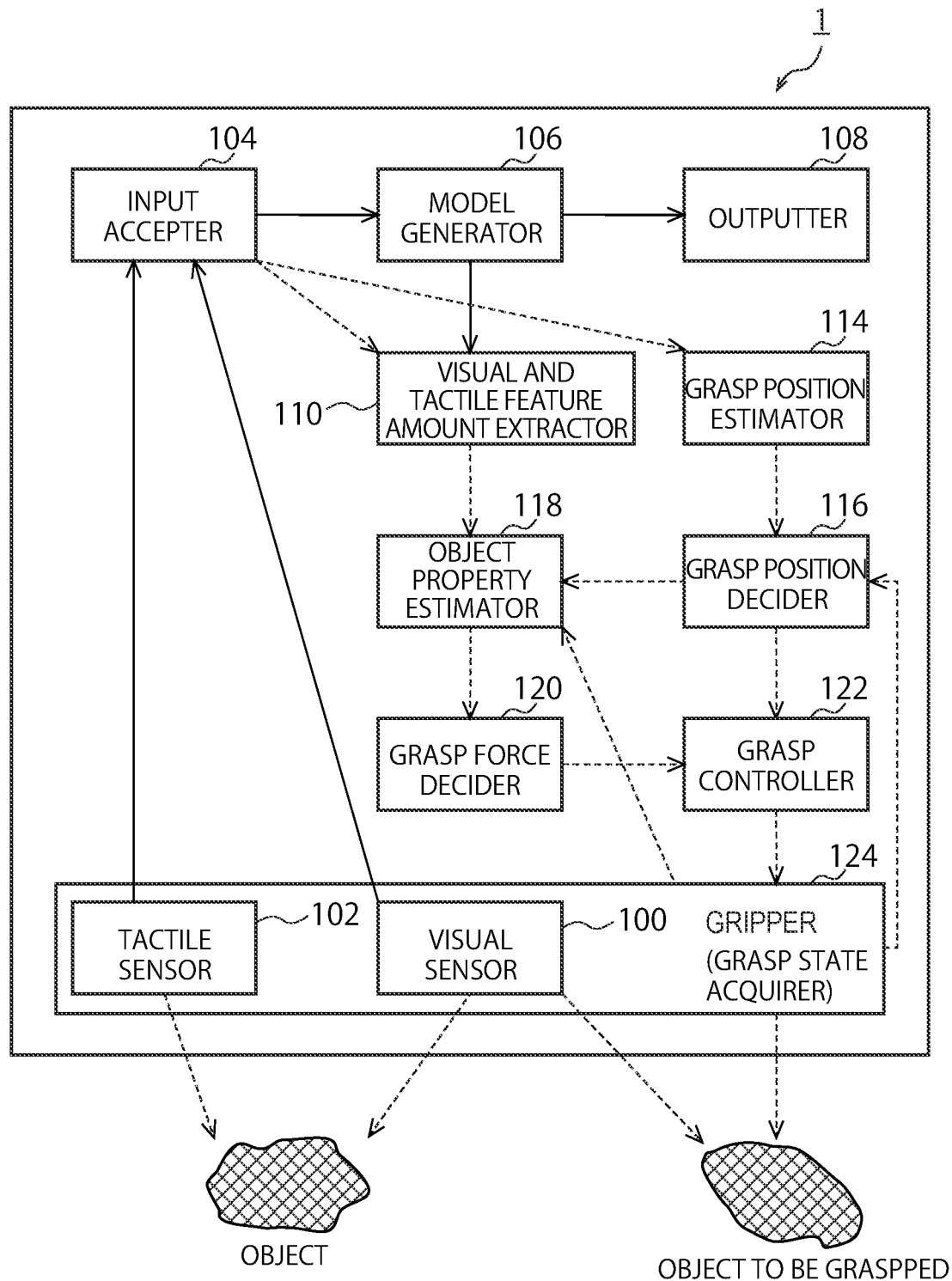
FIG. 11 is a block diagram illustrating functions of a tactile information estimation apparatus according to some embodiments.

Although the gripper 124 is designed to be provided in the above-described embodiment, it is also possible that the grasp information acquirer 112 in the above-described second embodiment is served also as the gripper 124. FIG. 11 is a block diagram illustrating a configuration in which the gripper 124 is provided, and the gripper 124 is served also as the grip information acquirer 112.

As illustrated in FIG. 11, the gripper 124 may be provided with the tactile sensor 102 and the visual sensor 100. The visual sensor 100 is not required to be provided to the gripper 124, and it may also be provided separately from the gripper 124. As another example, a visual sensor 100 which is different from the visual sensor 100 provided to the gripper 124 may also be further provided to the tactile information estimation apparatus 1.

As described above, by providing the gripper 124 which finally grasps an object and the grasp information acquirer 112 provided with the tactile sensor 102 which acquires tactile information, as the same device, it becomes possible to perform the estimation and the decision of the grasp force and the grasp position more precisely.

In the tactile information estimation apparatus 1 in each of the embodiments as illustrated in FIG. 1, FIG. 5, FIG. 8, and FIG. 11, it is also possible that a controller (not illustrated) may collectively or individually perform all of or a part of the control of data input from the visual sensor 100 and the tactile sensor 102, the control of model generation in the model generator 106, the control of extraction of the visual and tactile feature amount in the visual and tactile feature amount extractor 110, the control of estimation in the grasp position estimator 114 and the object property estimator 118, the control of decision in the grasp position decider 116 and the grasp force decider 120, and the control of the grasp controller 122. The controller may also be analog control circuitry, digital control circuitry, or control circuitry implemented by FPGA or the like.

In the above entire description, at least a part of the tactile information estimation apparatus 1 may be configured by hardware, or may also be configured by software and a CPU and the like perform the operation based on information processing of the software. When it is configured by the software, it is possible to design such that a program which realizes the tactile information estimation apparatus 1, and at least a partial function thereof is stored in a storage medium such as a flexible disk or a CD-ROM, and read by a computer to be executed. The storage medium is not limited to a detachable one such as a magnetic disk or an optical disk, and it may also be a fixed-type storage medium such as a hard disk device or a memory. Specifically, it is possible to design such that the information processing by the software is concretely implemented by using a hardware resource. Besides, it is also possible to design such that the processing by the software is implemented by the circuitry of FPGA or the like and executed by the hardware. The generation of the learning model or processing after performing input in the learning model may be carried out by using an accelerator such as a GPU, for example.

Further, the data estimation model according to the present embodiment can be used as a program module being a part of artificial-intelligence software. Specifically, a CPU of a computer operates to perform calculation and output results based on the model stored in a storage unit.

A format of the image being the visual information input in the above-described embodiments may be any format such as raw data or a PNG format as long as it is possible to appropriately express the texture information and the shape information.

A person skilled in the art may come up with addition, effects, or various kinds of modifications of the present disclosure based on the above-described entire description, but, examples of the present disclosure are not limited to the above-described individual embodiments. Various kinds of addition, changes and partial deletion can be made within a range that does not depart from the conceptual idea and the gist of the present disclosure derived from the contents stipulated in claims and equivalents thereof.

The invention claimed is:

1. An apparatus for estimating tactile information, comprising:
   one or more memories; and one or more processors configured to:
input at least visual information of a first object into a neural network model, the neural network model having been trained using visual information of a second object and tactile information of the second object, and
extract and output, based on the neural network model, information relating to tactile information of the first object,
wherein the visual information of the first object includes at least texture information of a surface of the first object, and the visual information of the second object includes at least texture information of a surface of the second object.

2. The apparatus according to claim 1, wherein the neural network model is generated using an autoencoder that has been trained to output the tactile information of the second object by inputting the visual information of the second object.

3. The apparatus according to claim 1, wherein the neural network is an encoder based on an autoencoder that has been trained to output the tactile information of the second object by inputting the visual information of the second object.

4. The apparatus according to claim 1, wherein the information is extracted based on an output from an intermediate layer of the neural network model.

5. The apparatus according to claim 1, wherein the one or more processors are further configured to output a result of mapping a visual and tactile feature amount of the first object to a space of two dimensions or higher.

6. The apparatus according to claim 1, wherein the information is extracted based on a visual and tactile feature amount generated by the neural network model.

7. The apparatus according to claim 1, wherein the information includes at least one of the tactile information of the first object or property information of the first object.

8. The apparatus according to claim 1, wherein the neural network model is trained using the tactile information of the second object acquired by one or more tactile sensors.

9. The apparatus according to claim 1, wherein the tactile information of the second object includes pressure information.

10. The apparatus according to claim 1, wherein the neural network model is trained using the tactile information of the second object in time series.

11. The apparatus according to claim 1, wherein the visual information of the first object includes an image of the first object, and the visual information of the second object includes an image of the second object.

12. The apparatus according to claim 1, wherein the visual information of the first object includes depth information of the first object, and the visual information of the second object includes depth information of the second object.

13. An apparatus for learning a neural network model, comprising:
one or more memories; and
one or more processors configured to:
learn the neural network model using visual information of a second object and tactile information of the second object,
wherein when at least visual information of a first object is inputted to the learned neural network model, the learned neural network model outputs information relating to tactile information of the first object,
wherein the visual information of the first object includes at least texture information of a surface of the first object, and the visual information of the second object includes at least texture information of a surface of the second object.

14. A method for estimating tactile information, comprising
inputting, by one or more processors, at least visual information of a first object into a neural network model, the neural network model having been trained using visual information of a second object and tactile information of the second object, and
extracting and outputting, by the one or more processors, based on the neural network model, information relating to tactile information of the first object,
wherein the visual information of the first object includes at least texture information of a surface of the first object, and the visual information of the second object includes at least texture information of a surface of the second object.

15. A method for learning a neural network model, comprising
learning, by one or more processors, the neural network model using visual information of a second object and tactile information of the second object,
wherein when at least visual information of a first object is inputted to the learned neural network model, the learned neural network model outputs information relating to tactile information of the first object,
wherein the visual information of the first object includes at least texture information of a surface of the first object, and the visual information of the second object includes at least texture information of a surface of the second object.

16. A system comprising:
one or more memories;
one or more visual sensors acquiring visual information of a first object;
one or more end effectors manipulating the first object; and
one or more processors configured to:
input at least the visual information of the first object into a neural network model, and extract and output, based on the neural network model, tactile information to control the one or more end effectors, and
control the one or more end effectors to manipulate the first object based on the extracted information,
wherein the neural network model has been trained using visual information of a second object and tactile information of the second object,
wherein the visual information of the first object includes at least texture information of a surface of the first object, and the visual information of the second object includes at least texture information of a surface of the second object.

17. The system according to claim 16, wherein the neural network model is generated using an autoencoder that has been trained to output the tactile information of the second object by inputting the visual information of the second object.

18. The system according to claim 16, wherein the neural network is an encoder based on an autoencoder that has been trained to output the tactile information of the second object by inputting the visual information of the second object.

19. The system according to claim 16, wherein
the extracted information includes at least one of tactile information of the first object or property information of the first object.

20. The system according to claim 16, wherein
the extracted information is a manipulation signal for the one or more end effectors.

21. The system according to claim 16, wherein
the one or more processors are configured to:
extract the information by inputting at least the visual information of the first object into the neural network model while the one or more end effectors do not manipulate the first object.

22. The system according to claim 16, wherein
the one or more processors are configured to:
infer a grasp position for the first object of the one or more end effectors based on the visual information of the first object.

23. The system according to claim 22, wherein
the one or more processors are configured to:
extract the information based on the inferred grasp position for the first object of the one or more end effectors.

24. The system according to claim 16, wherein
the visual information of the first object includes an image of the first object, and the visual information of the second object includes an image of the second object.

25. The system according to claim 16, wherein
the neural network model is trained using the tactile information of the second object acquired by one or more tactile sensors.

26. The system according to claim 16, wherein
the visual information of the first object includes depth information of the first object, and the visual information of the second object includes depth information of the second object.

27. The system according to claim 16, further comprising one or more tactile sensors acquiring tactile information of the first object, wherein
the one or more processors are configured to input the visual information of the first object and the tactile information of the first object acquired by the one or more tactile sensors into the neural network model, and extract the information to control the one or more end effectors.

28. The system according to claim 16, wherein
the one or more processors are further configured to update manipulation of the first object based on tactile information of the first object acquired by one or more tactile sensors.

29. The system according to claim 16, wherein
the one or more processors are configured to:
update at least one of a grasp position for the first object of the one or more end effectors or a grasp force for the first object of the one or more end effectors.

30. The system according to claim 29, wherein
the one or more processors are configured to:
update the at least one of the grasp position or the grasp force, based on reinforce learning.

31. The system according to claim 16, wherein
the one or more end effectors are configured to grasp the first object based on the extracted information.

32. The system according to claim 16, wherein
the one or more processors are configured to control a grasp force of the one or more end effectors, based on the extracted information.

33. The system according to claim 16, wherein the one or more end effectors are provided with the one or more visual sensors.

34. A method comprising:
inputting, by one or more processors, at least visual information of a first object into a neural network model, and extracting and outputting, based on the neural network model, tactile information to control one or more end effectors, and
controlling, by the one or more processors, the one or more end effectors to manipulate the first object based on the extracted information,
wherein the neural network model has been trained using visual information of a second object and tactile information of the second object,
wherein the visual information of the first object includes at least texture information of a surface of the first object, and the visual information of the second object includes at least texture information of a surface of the second object.

\* \* \* \* \*